(12) United States Patent
Doughan et al.

(10) Patent No.: US 9,176,712 B2
(45) Date of Patent: Nov. 3, 2015

(54) NODE GROUPED DATA MARSHALLING

(71) Applicant: Oracle International Corporation, Redwood City, CA (US)

(72) Inventors: Blaise P. Doughan, Ottawa (CA); Denise M. Smith, Ottawa (CA)

(73) Assignee: Oracle International Corporation, Redwood City, CA (US)

( * ) Notice: Subject to any disclaimer, the term of this patent is extended or adjusted under 35 U.S.C. 154(b) by 254 days.

(21) Appl. No.: 13/826,626

(22) Filed: Mar. 14, 2013

(65) Prior Publication Data

US 2014/0282391 A1 Sep. 18, 2014

(51) Int. Cl.
G06F 9/44 (2006.01)

(52) U.S. Cl.
CPC ............. *G06F 8/315* (2013.01); *G06F 9/4428* (2013.01)

(58) Field of Classification Search
CPC .................................................... G06F 9/4428
USPC ......................................................... 717/116
See application file for complete search history.

(56) References Cited

U.S. PATENT DOCUMENTS

| | | | |
|---|---|---|---|
| 5,493,680 A | 2/1996 | Danforth | |
| 5,511,197 A | 4/1996 | Hill et al. | |
| 5,632,031 A | 5/1997 | Velissaropoulos et al. | |
| 5,724,588 A * | 3/1998 | Hill et al. | 719/328 |
| 5,737,607 A * | 4/1998 | Hamilton et al. | 719/316 |
| 5,809,507 A | 9/1998 | Cavanaugh, III | |
| 6,230,159 B1 | 5/2001 | Golde | |
| 7,650,591 B2 | 1/2010 | Bau | |
| 7,730,473 B2 * | 6/2010 | Mountain et al. | 717/163 |
| 2002/0052984 A1 | 5/2002 | Jindal et al. | |
| 2004/0015840 A1 | 1/2004 | Walker | |
| 2006/0048097 A1 * | 3/2006 | Doshi | 717/120 |
| 2008/0215613 A1 | 9/2008 | Grasso | |
| 2010/0269104 A1 | 10/2010 | Woods | |
| 2011/0271258 A1 * | 11/2011 | Park et al. | 717/127 |

FOREIGN PATENT DOCUMENTS

EP 0766172 4/1997

* cited by examiner

*Primary Examiner* — John Chavis
(74) *Attorney, Agent, or Firm* — Robert C. Kowert; Meyertons, Hood, Kivlin, Kowert & Goetzel, P.C.

(57) ABSTRACT

Node Grouped Data Marshalling may involve converting programming objects to marshalled data. A marshaller application may determine a class type for each of the programming objects to be marshalled. Two or more of the objects may be of the same class type and may derive from a shared base class. The marshalling application may group of the objects based on the objects' class types. The objects may be marshalled using a set of key-value pairs where keys may identify the class type of an object and where the values may represent the contents of the object and may itself be a set of key-value pairs. A marshalling application may generate a textual representation of the objects such that each grouping of class types is identified by a single key name.

20 Claims, 7 Drawing Sheets

```
{
    "directory" : {
        "customer" : [ {
            "id" : "1"
        }, {
            "id" : "2"
        } ],
        "employee" : [ {
            "id" : "A"
        }, {
            "id" : "B"
        } ]
    }
}
```

FIG. 5

NODE GROUPED DATA MARSHALLING

BACKGROUND

In modern computer systems data frequently must be moved between different parts of a computer program or from one program to another, either within the same computer system or across a network. Data marshalling is the process of transforming a memory representation of a programming object to a format more suitable for storage and/or transmission. Data marshalling may also be considered data serialization or data binding.

The opposite, or reverse, of marshalling may be called unmarshalling or demarshalling. In general, marshalling an object includes recording its current state in such a way that when the marshalled object is "unmarshalled", a copy of the original object is generated.

A traditional method of representing marshalled data is to use a lightweight, text-based, language-independent data-interchange format. One common data-interchange format is JavaScript Object Notation (JSON) which is a text format defined with a collection of (possibly nested) name/value pairs.

Key-value pairs may include a key name identifying the key-value pair and a value that represents some data value being stored in the marshalled data. For instance, when marshalling the member data (e.g., class properties) of a programming object, the name of a key-value pair may be used to identifying the property name, while the value may represent the actual value of the member data for the object. For example, when marshalling the member data for an object that includes an "id" property whose value is "1", the marshalled data may include a key-value pair with a key name of "id" and a 1 as the value.

One characteristic of modern computer programming is the use of object oriented programming language in which programming objects may be of a particular class type that is derived from a base or root class, thus allowing properties and methods of the root class to be used by the derived class without requiring the duplication of those properties and method in the derived class definition. Thus, the marshalling of programming objects frequently includes a method for indicating class types and thereby inheritance relationships in the marshalled data.

A traditional approach for representing inheritance in marshalled data is to introduce an additional property when writing out the properties of a class. The additional property generally indicates the class type (or sub-type) of the class. This additional property may be referred to as the inheritance indicator. When the data is unmarshalled, the class type of the programming object may then be identified from the inheritance indicator. Frequently, care must be taken to ensure that no conflict exists between the additional property name used as an inheritance indicator and any existing properties of the object class.

SUMMARY

Described herein are various embodiments of systems and methods for Node Grouped Data Marshalling to convert one or more programming objects to marshalled data. For example, an application configured to marshal programming object may first analyze a collection of programming objects (e.g., such as one or more Java® objects) to determine a class type for each of the programming objects. Two or more of the objects may be of the same class type and all the collection of objects may be of class types that derive from a shared base (or root) class. Thus, the marshalling application may identify one or more groupings of the objects based on the objects' associated class types.

When marshalling a collection of programming objects, a marshalling application may use marshalled data that includes a set of key-value pairs. In marshalled data, keys may represent and/or identify the class types of the programming objects being marshalled. The values may represent the contents of the object (e.g., the member variables and/or properties) and itself may be a set of key-value pairs.

For example, each programming object may be represented as a key name representing the class type of the object and one or more data values identifying various properties of object.

Thus, a marshalling application may generate a textual representation of the collection of programming objects utilizing the key name and data values such that each grouping of class types is identified by a single key name. The data values associated with that key name therefore may identify each of the programming objects of that corresponding class type.

For example, consider a collection of four programming objects representing people, each programming object is derived from a root class, "Person", but is also of one of two derived classes—either "Employee" or "Customer." When marshalling this example collection of objects, a marshalling application may group the four objects into two groups by class type, namely "Employee" or "Customer." The generated marshalled textual output may include one class type key name corresponding to the "Employee" class whose data values identify all the objects representing employees and another class key name corresponding to the "Customer" class whose data values identify all the objects representing customers.

Thus, rather than including a separate data value identifying the class type with each marshalled object, Node Grouped Data Marshalling may group the marshalled objects by shared class types, according to some embodiments.

BRIEF DESCRIPTION OF THE DRAWINGS

FIG. 5 is a textual listing illustrating one embodiment of marshalled data generated using Node Grouped Data Marshalling, as described herein.

DETAILED DESCRIPTION OF EMBODIMENTS

Figure 1:
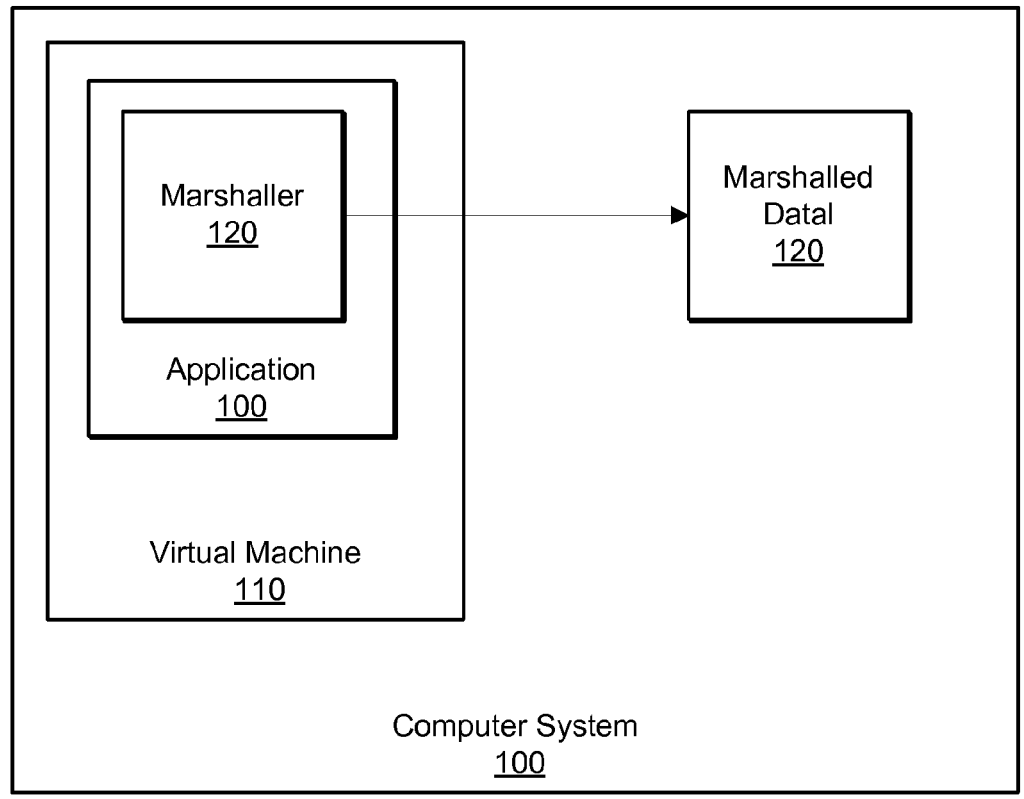
FIG. 1 is a logical block diagram illustrating one embodiment of a computer system on which Node Grouped Data Marshalling may be implemented.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, as part of Node Grouped Data Marshalling, a data marshaller may, in some embodiments, be configured to receive a programming object to be marshaled to a persistent data model. For example, an application may include a marshalling module which accepts programming objects via a marshalling function or procedure, such as may be part of an object oriented programming object. A marshaller may be configured to analyze the received programming object to identify instance objects as instance data of the programming object. For example, a programming object may include one or more member data object and a marshaller may identify those member data objects as instance data of the programming object. The marshaller may also identify one or more class types associated with each instance object.

FIG. 1 is a logical block diagram illustrating one embodiment of a computer system on which Node Grouped Data Marshalling may be implemented. As illustrated in FIG. 1 a Computer System 100 may include a virtual machine configured to load and execute applications, such as Application 100, which may include a Marshaller 120 configured to implement Node Grouped Data Marshalling, as described herein. Additionally, Computer system 100 may also include persistent data storage 130 on which Marshaller 120 may create, access and/or store Marshalled Data 120. As noted above, Marshaller 120 may be configured to analyze programming objects and/or collections of programming objects and generate marshalled data from which the objects and object collections may be regenerated, if needed. As noted above, generating marshalled data from programming objects may be referred to as marshalling, while generating programming objects from marshalled data may be referred to as unmarshalling.

While described herein, by way of example, marshalling may involve the generating of textual marshalled data, in other embodiments, marshalling may involve data formats that are not textually based. For example, in one embodiment, Marshaller 120 may be configured to generate marshalled data formatted according to a lightweight, text-based, language-independent data-interchange format, such as JavaScript Object Notation (JSON). In an embodiment using JSON, Node Grouped Data Marshalling may be implemented using either JSON Binding or JSON Serialization. In general, any of various data formats may be utilized when marshalling and unmarshalling data, according to various embodiments.

When marshalling data, Marshaller 120 may serialize the data as a set of key-value pairs, according to some embodiments. For example, an object may be serialized as a set of key-value pairs, where the keys identify a class name. The value may represent the contents of the object (e.g., the member variables and/or properties) and may itself be a set of key-value pairs.

Marshalling may include the class inheritance model of the programming objects being marshaled. For example, an application may include a root class, Person from which two sub-classes may be derived, Customer and Employee. When marshaled to a persistent data model, the data model may include inheritance information indicating an object's class type.

The marshaller may then generate marshalled data based on the analyzed programming object. For example, the marshalled data may include key names identifying the class types and may also include data values. For instance each key name may be paired with one or more of the data values, and each data value may identify one of the one or more instance data objects from the programming object being marshaled.

In some embodiments, the information in the persistent data model may be grouped by class type (e.g., by using the inheritance indicator) within the data model so that the class type may only be indicated once for the entire group of data values associated with that class type. Thus, all the data values identifying instance data objects for all instance objects corresponding to a respective class type may be paired with a single key name identifying the respective class type, according to some embodiments.

For instance, an application may be configured to maintain a list of objects representing people categorized by their relationship with a company. As in the example described above, the application may include a root class Person and two derived classes, Customer and Employee, for maintaining a list of people categorized by their relationship with a company. Using this example, a list of four people, two customers named Alice and Bob, as well as two employees named Cindy and Dave, may be marshalled in two groups. One group representing the two objects of class Customer, and the other group representing the two objects of class Employee.

Using the object oriented text based language describe above, the marshalled data may include a root key name, "person" under which a sub key of "customer" may include two data values, "Alice" and "Bob." Also under the main Person key may be another sub key of "employee" including "Cindy" and "Dave." Thus, rather than having a single group of four data values, each including an indication of a class type (e.g., either "Customer" or "Employee"), the marshalled data generated according to Node Grouped Data Marshalling, as described herein, may include two sub-groupings of two data values which, where the sub-groups indicate the class type. Thus, when implementing Node Grouped Data Marshalling, as described herein, a persistent data model may exhibit a smaller data size from having less repetition due to grouping the data values by class type rather than having each data value include an indication of its respective class type.

When marshalling data, Marshaller 120 may be configured to maintain a data or metadata structure that associates a node name (e.g., a key name of a key-value pair) with a class type from an inheritance hierarchy of classes. This metadata structure may be used to identify the particular string to use as node names when marshalling data. For example, in some embodiments, Marshaller 120 may use the actual class name (or a variation thereof) as the node name (e.g., key name) in the marshalled data. For example, when marshalling object in the Java® execution environment, Marshaller 120 may obtain the actual class name of an object (e.g., such as via the Java® reflection API) and may use it as the basis for the relevant node name.

Thus, in some embodiments, there may be a default method for generating the node name from the in memory representation of an object, but in other embodiments, the programmer or user may be able to specify an arbitrary string to use as the node name to use with a particular class type in the inheritance hierarchy.

As noted above, in some embodiments, the particular string used as a node name may be stored in a metadata structure allowing Marshaller 120 to look up a mapping of node names to actual class names when marshalling and unmarshalling data.

When marshalling a single programming object, Marshaller 120 may be configured to first obtain the class name (or inheritance indicator) and use that as the node name (e.g., in a name value pair) in the marshalled data. When marshalling a collection of objects, Marshaller 120 may be configured to group the objects by class type (or inheritance indicator) and then the class type as a node name (e.g., a key name in a name value pair) associated with the marshalled data representing the individual objects, as will be explained in more detail below.

When unmarshalling data that was previously marshalled, Marshaller 120 may, in some embodiments, be configured to generate and maintain a tree data structure as the marshalled data is parsed. For example, if marshalled data includes a number of nodes of a given class type, as may be the case when a collection of objects is marshalled, the actual class information regarding the referenced class type may be stored in the tree data structure for reference when generating other objects of the same class type.

As noted above, in some embodiments, arbitrary (e.g., programming or use specified) strings may be used as key names when marshalling data. When unmarshalling data, a tree data structure maintained by Marshaller 120 may be used to store mappings of the arbitrary key names and the actual class inheritance they represent, according to some embodiments.

Figure 2:
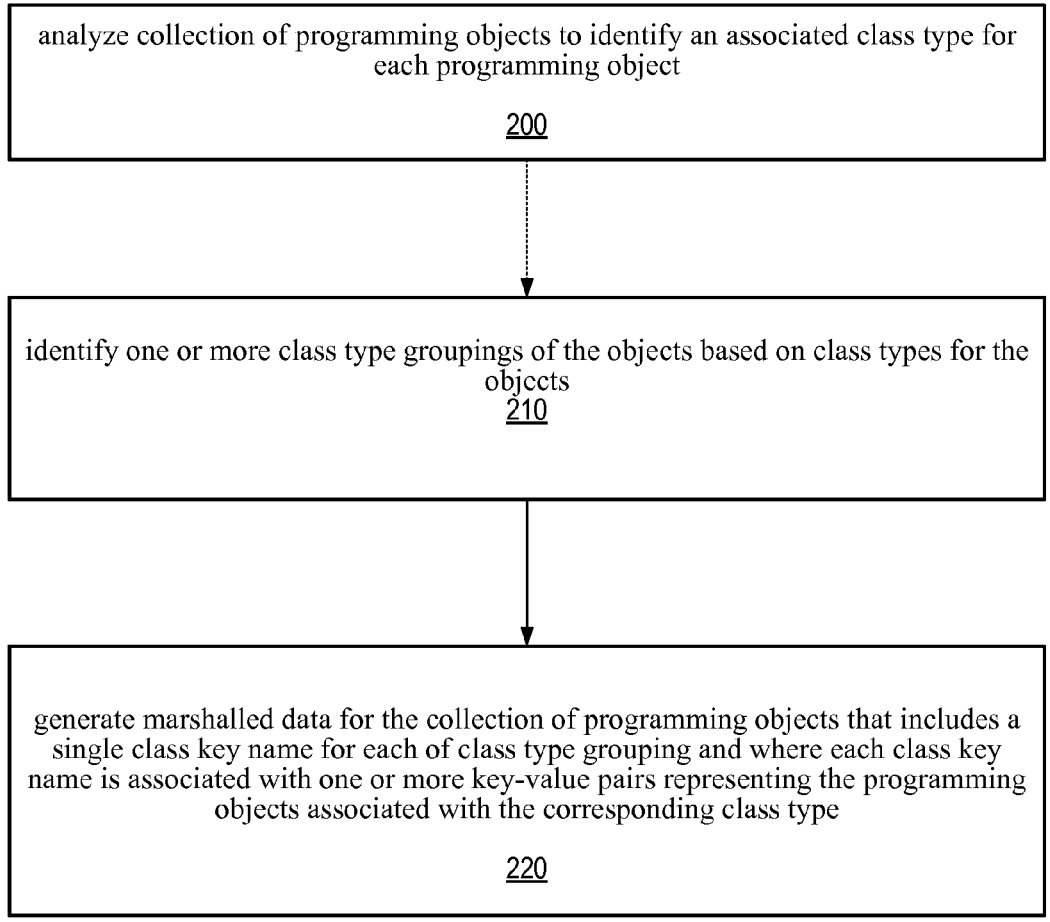
FIG. 2 is a flowchart illustrating one embodiment of a method for marshalling using Node Grouped Data Marshalling, as described herein.

FIG. 2 is a flowchart illustrating one embodiment of marshalling using Node Grouped Data Marshalling, as described herein. As shown in block 200, a marshaller, such as Marshaller 120, may be configured to analyze a collection programming objects to identify an associated class type for each programming object. For example, when marshalling a collection of objects, that collection may be passed to a marshalling module, such a Marshaller 120, and the marshaller may identify the class type for each of the objects in the collection. For instance, in one embodiment, a marshaller developed for the Java® language may use the Java® reflection API to inspect the objects to determine the object's class type.

The marshaller may then, as shown in block 210, identify one or more class type groupings of the objects based on class types for the object. Thus, Marshaller 120 may be configured to group the objects by class type such that all objects of a particular class are grouped together.

As shown in block 220, the marshaller may then generate marshalled data for the collection of programming objects, where the marshalled data includes a single class key name for each of the class groupings and where each class key name is associated with key-value pairs that represent the objects of that class grouping, according to one embodiment.

Figure 3:
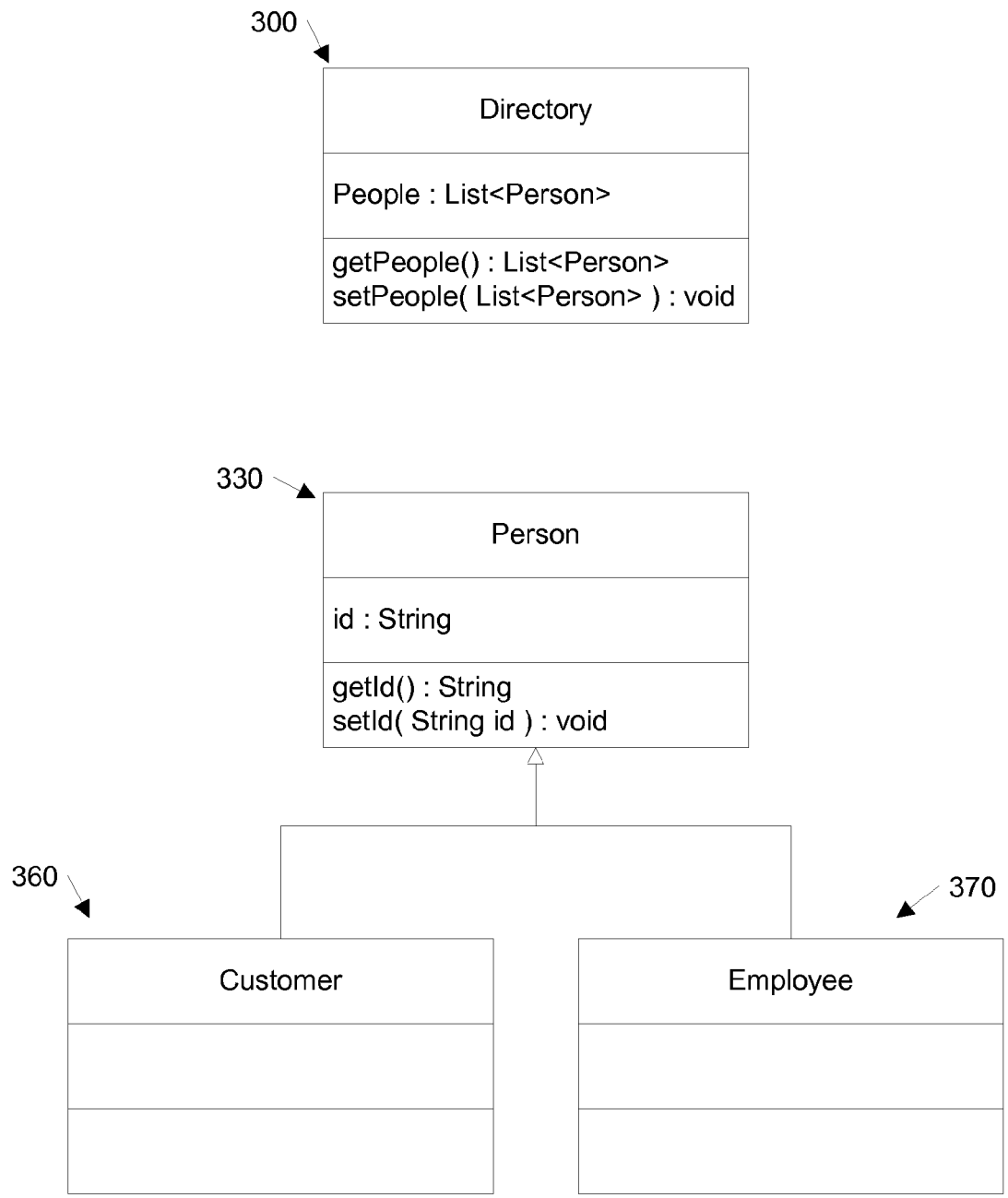
FIG. 3 is a logical inheritance diagram illustrating example programming objects subject to Node Grouped Data Marshalling, according to one embodiment.

FIG. 3 is a logical inheritance diagram illustrating example programming objects subject to Node Grouped Data Marshalling, according to one embodiment. As an example for explanatory purposes only, FIG. 3 illustrates a set of classes that may be used to maintain a simple company directory. Directory object 300 may be configured to store a list of "Person" objects in a member property "People" and may also include methods for getting and setting the list of "Person" objects, according to one embodiment.

Additionally, FIG. 3 illustrates a "Person" class definition 330 that includes an "id" string that may be used as a unique identifier for the person as well as methods for getting and setting the "id." FIG. 3 also illustrates two subclasses derived from "Person", namely "Customer" 360 and "Employee" 370.

An example code listing is shown below that matches the inheritance diagram shown in FIG. 3. First of all there is "Person" class is defined, along with the two subclasses: "Customer" and "Employee". As in FIG. 3, there is also a collection object (i.e., "Directory") that maintains a collection of "Person" objects. Each object in the collection is either of class "Customer" or of class "Employee".

```
public class Person {
    private String id;
    public String getId( ) {
        return id;
    }
    public void setId(String id) {
        this.id = id;
    }
}
public class Customer extends Person {
}
public class Employee extends Person {
}
public class Directory {
    private List<Person> people = new ArrayList<Person>( );
    public List<Person> getPeople( ) {
        return people;
    }
    public void setPeople(List<Person> people) {
        this.people = people;
    }
}
```

Figure 4:
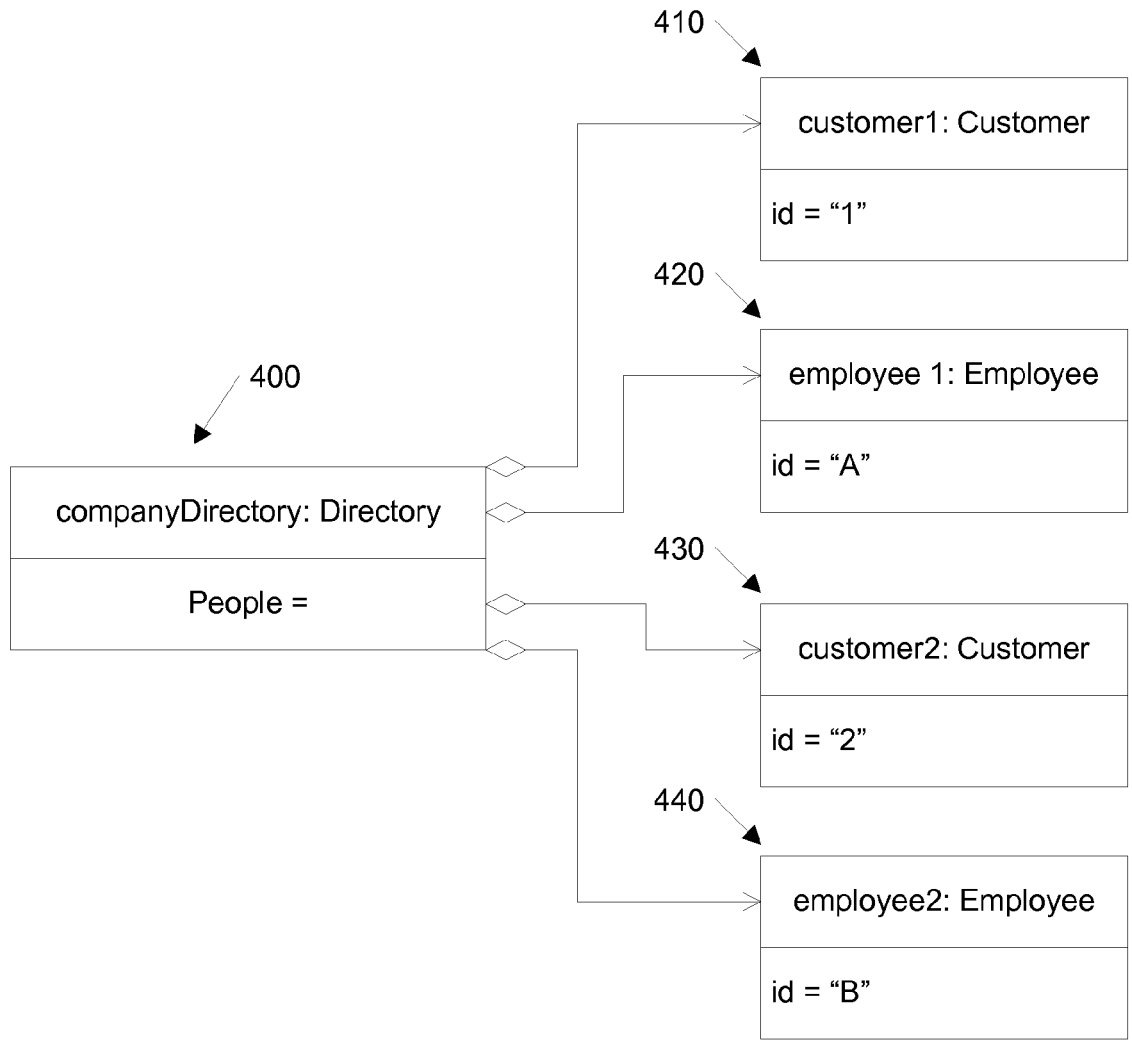
FIG. 4 is a logical diagram illustrating associated programming objects subject to Node Grouped Data Marshalling, according to one embodiment.

FIG. 4 is a logical diagram illustrating an example programming object model for Node Grouped Data Marshalling, according to one embodiment. The object model illustrated in FIG. 4 represents a set of "Customer" and "Employee" objects stored in an object of class "Directory", according to the class definitions described previously in FIG. 3 and above. As shown in FIG. 4, a companyDirectory object 400 of class Directory stores objects 410, 420, 430 and 440. Objects 410 and 410 are of class "Customer", while objects 420 and 440 are of class "Employee." As noted above regarding FIG. 3, classes "Customer" and "Employee" are derived from base class "Person."

Below is a partial code example that if executed may generate the objects illustrated in FIG. 4.

```
{
   ...
       Directory companyDirectory = new Directory( );
       Customer customer1 = new Customer( );
       customer1.setId("1");
       companyDirectory.getPeople( ).add(customer1);
       Employee employeeA = new Employee( );
       employeeA.setId("A");
       companyDirectory.getPeople( ).add(employeeA);
       Customer customer2 = new Customer( );
       customer2.setId("2");
       companyDirectory.getPeople( ).add(customer2);
       Employee employeeB = new Employee( );
       employeeB.setId("B");
       companyDirectory.getPeople( ).add(employeeB);
   ...
}
```

FIG. 5 is a textual listing illustrating one embodiment of marshalled data generated using Node Grouped Data Marshalling, as described herein. When marshalling the Directory object from the above examples, a marshaller may generate marshalled code that includes a "directory" key name representing the entire collection of people. The data value associated with the "directory" key name may include a set of name value pairs that represent the collection of objects.

As shown in block 500 of FIG. 5, the marshalled data may include a set of nested key-value pairs, which may also be called nodes. For instance, the top level key-value pair may include the key name "directory" indicating the collection object companyDirectory from the above example. The value part of the directory node may include a number of other key-value pairs representing the object stored in the collection object. For instance, the key name "directory" is associated with two key-value pairs. One with a key name of "customer" and another with a keyname of "employee." These sub-nodes represent the class type groupings of the above example.

Additionally, each of the sub-nodes includes two key-value pairs that each identifies one of the objects in the Directory collection. Thus, the "customer" sub-node includes two additional nodes, one identifying an object of class Customer with an "id" of "1", and the other identifying an object of class Customer with an "id" of "2". Similarly, the "employee" sub-node includes two additional nodes, one identifying an object of class Employee with an "id" of "A" and another identifying an object of class Employee with an "id" of "B". As is shown in FIG. 5, in the marshalled data the four nodes representing the objects stored in the companyDirectory object are grouped by class type. In other words, the two customers are grouped together within a single "customer" node and the two employees are grouped together within a single "employee" node.

Please note that the exact formatting of the text shown in FIG. 5 represents only one possible example, according to one embodiment. In some embodiments, Marshalled data may be formatted according to a lightweight, text-based, language-independent data-interchange format, such as JavaScript Object Notation (JSON). In other embodiments, marshalled data may be formatted according to different format styles, either textual or not. In general, any of various data formats may be utilized when marshalling and unmarshalling data, according to various embodiments.

For example, other formatting styles, including other separating characters (e.g., other than brackets and braces) may be used to define and denote various portions of marshalled data. Similarly, note that the example class definitions and contents are for ease of explanations and that in other embodiments, different and/or more complex classes, objects and collections may be used with Node Grouped Data Marshalling, as described herein.

Figure 6:
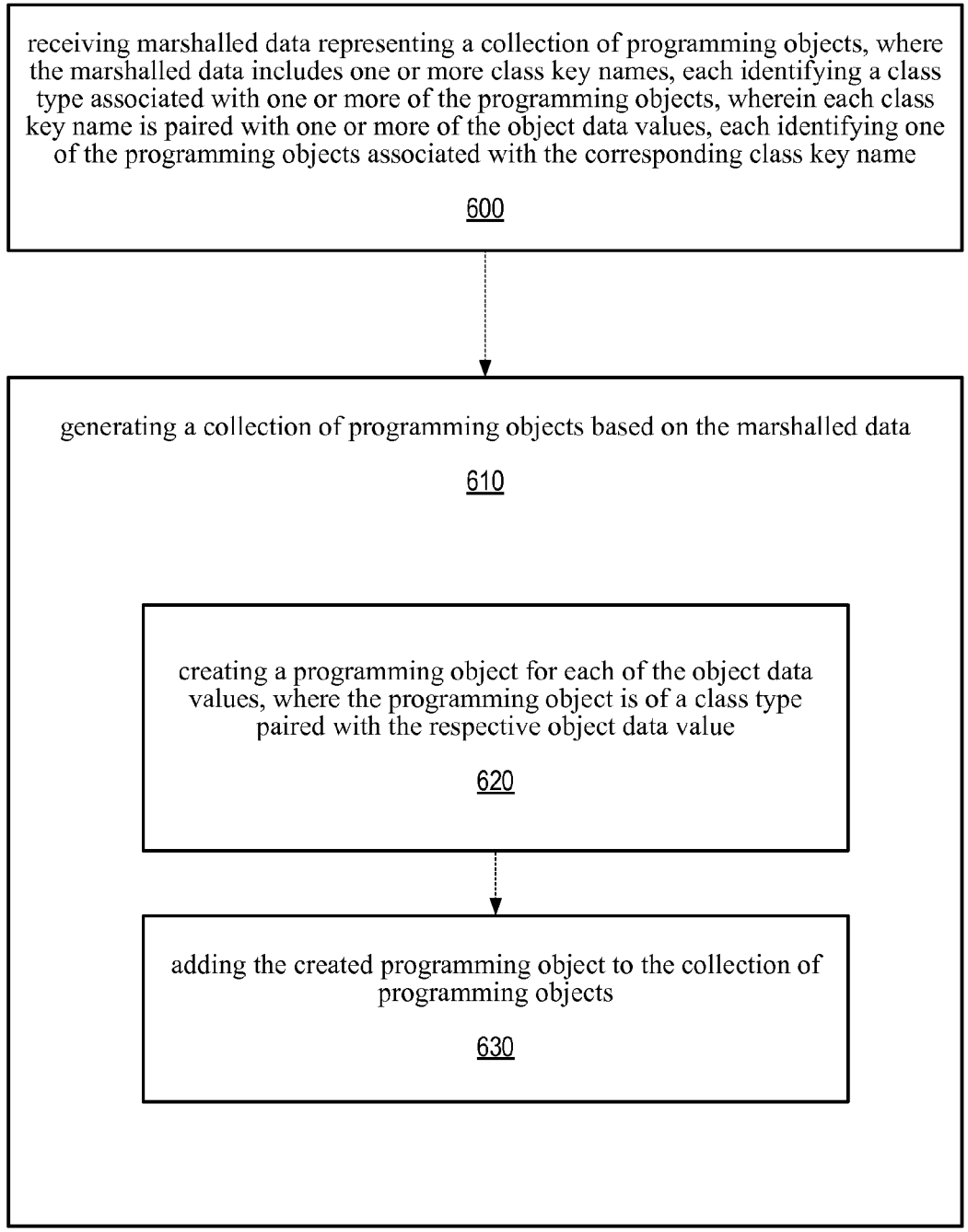
FIG. 6 is a flowchart illustrating one embodiment of a method for unmarshalling using Node Grouped Data Marshalling, as described herein.

FIG. 6 is a flowchart illustrating one embodiment of a method for unmarshalling using Node Grouped Data Marshalling, as described herein. As shown in block 600, when unmarshalling, Marshaller 120 may be configured to receive marshalled data representing a collection of programming objects. According to one embodiment the marshalled data may be received from another application or process, either on the same computer system or from a separate system. For example, the marshalled data may have been sent as messages via one or more messaging formats over a network. In other embodiments, receiving the marshalled data may represent loading the marshalled data from a persistent data source, such as a hard drive or other data source.

The marshalled data may be include one or more class key names, each of which may identify a class type associated with one or more of the programming object represented by the marshalled data. Each class key name may be paired with one or more object data values (e.g., in key-value pairs) that may identify the programming objects associated with the corresponding key name.

As shown in block 610, Marshaller 120 may be configured to generate a collection of programming objects based on the marshalled data. As described above, the marshalled data may include a key-value pair representing a collection object configured to store one or more programming objects and Marshaller 120 may use the key name from the marshalled data to identify the class type of the collection object and generate an appropriate programming object, according to one embodiment. For instance, when unmarshalling the example data shown in FIG. 5, Marshaller 120 may generate a "directory" collection object as specified by the top level key name.

When generating the programming objects represented by the marshalled data, Marshaller 120 may be configured to parse through the nodes and sub-nodes in the marshalled data to identify the particular classes and class types to be generated. Using the example marshalled data from FIG. 5, Marshaller 120 may identify two classes of objects to generate, namely "Customer" and "Employee."

As shown in block 620 of FIG. 6, generating a collection of programming objects based on the marshalled data may involve creating a programming object for each of the object data values (e.g., name value pairs), where the programming object is of a class type identified by the key name associated with the respective object data values. By way of example, when unmarshalling the example data from FIG. 5, Marshaller 120 may be configured to generate an object of class "Customer" with an "id" of "1" as the key-value pair specifying a programming object with an "id" of "1" is associated with the "customer" key name.

After generating a programming object based on the unmarshalled data, Marshaller 120 may also be configured to add the newly created object to the collection of programming objects, as shown in block 620 of FIG. 6, according to one embodiment. For instance, when unmarshalling the example data in FIG. 5, Marshaller 120 may be configured to add the newly a created object of class "Customer" to the "Directory" object (i.e., based on the Directory class) specified by the top level key name.

Figure 7:
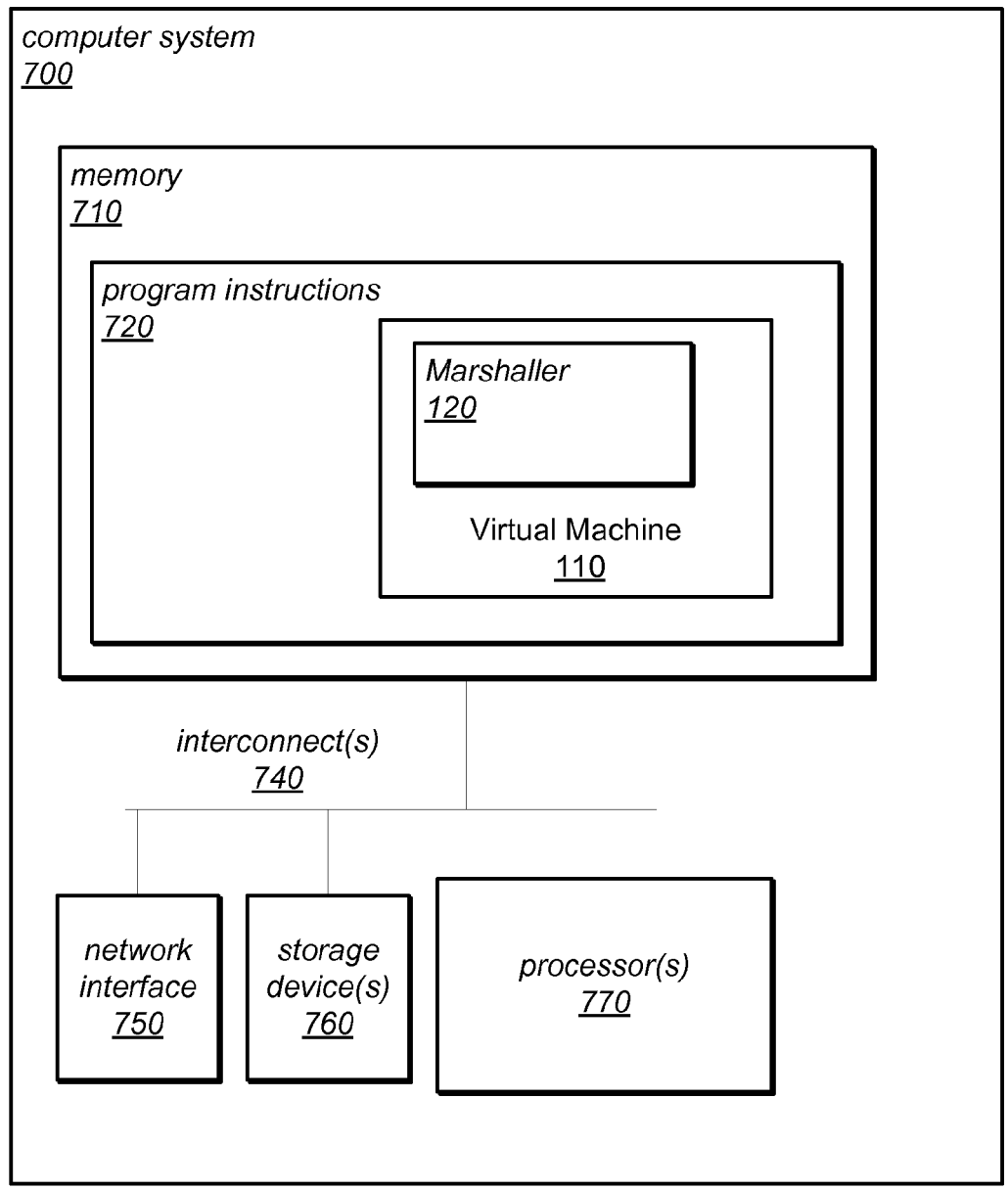
FIG. 7 is a logical block diagram illustrating an example system configured to perform Node Grouped Data Marshalling, according to one embodiment.

The techniques described herein for Node Group Data Marshalling may be implemented in any of a wide variety of computing systems. FIG. 7 illustrates an example computing system that is configured to implement Node Group Data Marshalling, as described herein and according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 700 may include a processor unit 770 (possibly including multiple processors, a single-threaded processor, a multi-threaded processor, a multi-core processor, etc.) which may be configured to execute one or more applications, such as Marshaller 120, which may be present within program instructions 720 stored in memory 710 of the same computer system 700 or may be present within program instructions stored within a memory of another computer system similar to or different from computer system 700.

The computer system 700 may include one or more system memories 710 (e.g., one or more of cache, SRAM DRAM, RDRAM, EDO RAM, DDR RAM, SDRAM, Rambus RAM, EEPROM, etc.), a system interconnect 940 (e.g., LDT, PCI, ISA, etc.), a network interface 750 (e.g., an ATM interface, an Ethernet interface, a Frame Relay interface, etc.), and one or more storage device(s) 760 (e.g., optical storage, magnetic storage, etc.). The memory medium may include other types of memory as well, or combinations thereof. In other embodiments, computer system 700 may include more, fewer, or different components than those illustrated in FIG. 7 (e.g., video cards, audio cards, additional network interfaces, peripheral devices, etc.). The processor(s) 770, the storage device(s) 760, the network interface 750 and the system memory 710 may be coupled to the system interconnect 740.

One or more of the system memories 710 may include program instructions 720 configured to implement some or all of the techniques described herein for Node Grouped Data Marshalling (according to any of the embodiments described herein). For example, one or more of the system memories 710 may include code to implement and/or execute Marshaller 120, according to one embodiment.

In various embodiments, program instructions 720, Marshaller 120, and/or individual sub-modules of these components may each be implemented in any of various programming languages or methods. For example, in one embodiment, Marshaller 120 may be Java® based, while in another embodiment, it may be written using the C or C++ programming languages. Moreover, in some embodiments, Marshaller 120 and various sub-modules of Marshaller 120 may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing, by a computer:
analyzing a collection of programming objects to identify an associated class type for each programming object, wherein each programming object has an associated class type and wherein two or more of the collection of programming objects are associated with a same class type, and wherein all of the collection of programming objects are associated with a base class type from which all the associated class types depend;
identifying one or more class type groupings of the objects based on the objects' associated class types;
generating marshalled data for the collection of programming objects, wherein the marshalled data comprises a single class key name for each of the class type groupings, wherein each class key name is associated with one or more key-value pairs representing the programming objects associated with the corresponding class type.

2. The method of claim 1, wherein the collection of programming objects is comprised in a single collection object, wherein the marshalled data comprises a collection key name representing a class type of the collection object, and wherein the collection key name is associated with a collection data value which comprises the one or more class key names and their paired object data values.

3. The method of claim 1, wherein at least one of the class key names is based on an internal representation of the identified class type.

4. The method of claim 3, wherein said analyzing comprises analyzing the programming object using Java reflection API.

5. The method of claim 1, wherein at least one of the class key names is based on user input.

6. The method of claim 1, wherein the marshalled data is formatted according to JavaScript Object Notation.

7. The method of claim 1, wherein the platform independent object oriented programming language is Java.

8. The method of claim 1, further comprising storing the marshalled data as a text file.

9. A method, comprising:
performing by a computer:
receiving marshalled data representing a collection of programming objects, wherein the marshalled data comprises one or more class key names, each identifying a class type associated with one or more of the programming objects, wherein each class key name is paired with one or more of the object data values, each identifying one of the programming objects associated with the corresponding class key name;
generating a collection of programming objects based on the marshalled data, wherein said generating comprises:
creating a programming object for each of the object data values, where the programming object is of a class type paired with the respective object data value; and
adding the created programming object to the collection of programming objects.

10. The method of claim 9, wherein the marshalled data comprises a collection key name representing a collection class type, the method further comprising generating a collection programming object of the collection class type, wherein said adding the created programming object to the collection of the programming objects comprises adding the created programming object to the collection programming object.

11. The method of claim 9, wherein said analyzing comprises performing a depth first traversal of the marshalled data.

12. The method of claim 9, further comprising maintaining mapping data that maps key names and their respective paired data values to respective instance variables of the programming object.

13. The method of claim 9, wherein the text-based marshalled data is formatted according to JSON.

14. The method of claim 13, wherein the marshalled data is formatted according to JavaScript Object Notation.

15. The method of claim 13, wherein the programming object is a Java-based programming object.

16. The method of claim 13, further comprising storing the marshalled data as a text file.

17. The method of claim 9, wherein the programming object is a Java-based programming object.

18. The method of claim 9, wherein said receiving comprises reading the marshalled data from a text file.

19. The method of claim 18, wherein said analyzing comprises analyzing the programming object using Java reflection API.

20. A non-transitory, computer-readable storage medium storing program instructions that when executed on one or more computers cause the one or more computers to perform:
analyzing a collection of programming objects in a platform independent object oriented programming language, wherein each programming object has an associated class type and wherein two or more of the collection of programming objects are associated with a same class type, and wherein all of the collection of programming objects are associated with a base class type from which all the associated class types depend;
identifying one or more class type groupings of the objects based on the objects' associated class types;
generating marshalled data for the collection of programming objects, wherein the marshalled data comprises a single class key name for each of the class type groupings, wherein each class key name is associated with one or more key-value pairs representing the programming objects associated with the corresponding class type.

* * * * *

UNITED STATES PATENT AND TRADEMARK OFFICE
CERTIFICATE OF CORRECTION

PATENT NO.      : 9,176,712 B2
APPLICATION NO. : 13/826626
DATED           : November 3, 2015
INVENTOR(S)     : Doughan et al.

It is certified that error appears in the above-identified patent and that said Letters Patent is hereby corrected as shown below:

In the drawings,

On sheet 1 of 7, in FIG. 1, under Reference Numeral 120, line 2, delete "Datal" and insert -- Data --, therefor.

Signed and Sealed this
Twenty-eighth Day of June, 2016

Michelle K. Lee
*Director of the United States Patent and Trademark Office*